United States Patent
Takaoka et al.

(10) Patent No.: US 10,125,655 B2
(45) Date of Patent: Nov. 13, 2018

(54) FILTER ABNORMALITY DETERMINATION SYSTEM

(71) Applicant: TOYOTA JIDOSHA KABUSHIKI KAISHA, Toyota-shi, Aichi-ken (JP)

(72) Inventors: Kazuya Takaoka, Susono (JP); Tomoyuki Kogo, Gotenba (JP); Hirokazu Nishijima, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 184 days.

(21) Appl. No.: 15/110,830

(22) PCT Filed: Jan. 14, 2015

(86) PCT No.: PCT/IB2015/000029
§ 371 (c)(1),
(2) Date: Jul. 11, 2016

(87) PCT Pub. No.: WO2015/107412
PCT Pub. Date: Jul. 23, 2015

(65) Prior Publication Data
US 2016/0326936 A1 Nov. 10, 2016

(30) Foreign Application Priority Data
Jan. 17, 2014 (JP) .................. 2014-006781

(51) Int. Cl.
*F01N 11/00* (2006.01)
*F01N 13/00* (2010.01)
*F01N 3/021* (2006.01)

(52) U.S. Cl.
CPC .............. *F01N 11/00* (2013.01); *F01N 3/021* (2013.01); *F01N 13/008* (2013.01);
(Continued)

(58) Field of Classification Search
CPC ........ F01N 11/00; F01N 13/008; F01N 3/021; F01N 2550/04; F01N 2560/05;
(Continued)

(56) References Cited

U.S. PATENT DOCUMENTS

2011/0081276 A1* 4/2011 Teranishi ................ F23N 5/003
422/83
2012/0144813 A1 6/2012 Yahata et al.
(Continued)

FOREIGN PATENT DOCUMENTS

JP  2011-252459  12/2011
JP  WO 2012053097 A1 *  4/2012 .............. F01N 11/00
(Continued)

*Primary Examiner* — Brandon Lee
(74) *Attorney, Agent, or Firm* — Finnegan, Henderson, Farabow, Garrett & Dunner, LLP

(57) ABSTRACT

A filter abnormality determination system includes: a PM sensor configured to introduce a part of exhaust gas flowing in the exhaust gas passage on the downstream side of a filter into a sensor body and to correlate a sensor output with an amount of particulate matter accumulated on a sensor element in the sensor body; an abnormality determining unit configured to perform filter abnormality determination on the basis of the output of the PM sensor; a determination timing determining unit configured to determine a timing at which the abnormality determining unit performs the abnormality determination on the basis of an estimated amount of particulate matter accumulated on the sensor element; and a determination performing adjusting unit configured to adjust the performing timing determined by the determination timing determining unit depending on a variation of an exhaust gas flow rate per unit time in the exhaust gas passage in which the PM sensor is disposed.

8 Claims, 10 Drawing Sheets

(52) U.S. Cl.
CPC ...... *F01N 2550/04* (2013.01); *F01N 2560/05* (2013.01); *F01N 2900/0422* (2013.01); *F01N 2900/0601* (2013.01); *F01N 2900/1411* (2013.01); *Y02T 10/47* (2013.01)

(58) Field of Classification Search
CPC ..... F01N 2900/0422; F01N 2900/0601; F01N 2900/1411; Y02T 10/47
See application file for complete search history.

(56) References Cited

U.S. PATENT DOCUMENTS

| | | | |
|---|---|---|---|
| 2012/0291632 A1 | 11/2012 | Nishijima | |
| 2013/0031954 A1* | 2/2013 | Yoshioka | F01N 13/008 73/23.31 |
| 2013/0192208 A1* | 8/2013 | Shibata | F01N 11/00 60/276 |

FOREIGN PATENT DOCUMENTS

| | | |
|---|---|---|
| JP | 2012-122399 | 6/2012 |
| JP | 5338996 | 8/2013 |
| WO | WO 2012/077182 A1 | 6/2012 |

* cited by examiner

FILTER ABNORMALITY DETERMINATION SYSTEM

CROSS-REFERENCE TO RELATED APPLICATIONS

This application is a national phase application of International Application No. PCT/IB2015/000029, filed Jan. 14, 2015, and claims the priority of Japanese Application No. 2014-006781, filed Jan. 17, 2014, the content of both of which is incorporated herein by reference.

BACKGROUND OF THE INVENTION

1. Field of the Invention

The present invention relates to an abnormality determination system of a filter disposed in an exhaust gas passage of an internal combustion engine.

2. Description of Related Art

In order to capture particulate matter (hereinafter, also referred to as "PM") included in exhaust gas discharged from an internal combustion engine, a filter is disposed in an exhaust gas passage thereof. When the filter reaches an abnormal state due to destruction or the like, exhaust gas from which the PM has not been satisfactorily removed is discharged and thus a PM sensor for detecting the PM in the exhaust gas may be disposed on the downstream side of the filter so as to detect the abnormal state of the filter. Here, depending on a situation in which the PM sensor is located, a deviation occurs between the output of the PM sensor and the amount of PM in the exhaust gas and it may be difficult to appropriately detect the PM. Accordingly, in a technique disclosed in International Publication No. 2012/77182 (WO2012/77182), with a focus put on a correlation between the deviation and the exhaust gas flow rate, improvement in PM detection accuracy is achieved by correcting the output of the PM sensor using the exhaust gas flow rate as a parameter.

Japanese Patent Application Publication No. 2012-122399 (JP 2012-122399 A) discloses a configuration in which the output of the PM sensor is adjusted on the basis of the fact that the attachment of PM to a sensor element of the PM sensor varies depending on the exhaust gas flow rate.

SUMMARY OF THE INVENTION

When a PM sensor, which is disposed on the downstream side of a filter disposed in an exhaust gas passage of an internal combustion engine, is used to determine whether the filter is abnormal, it is important to introduce exhaust gas including PM into the PM sensor so as to properly detect the PM in the exhaust gas. Particularly, in a PM sensor configured to correlate the amount of PM accumulated in the sensor element with the sensor output, when the exhaust gas to be detected does not appropriately reach the sensor element, it is difficult to detect the PM included in the exhaust gas.

When a variation of an exhaust gas flow rate in the exhaust gas passage provided with the PM sensor increases such as when the engine load of the internal combustion engine increases, the applicant of the invention found that an exhaust gas flow in the vicinity of the PM sensor is disturbed and the exhaust gas to be detected is not appropriately introduced into the body of the PM sensor. The applicant of the invention also found that this disturbance of exhaust gas is maintained for a relatively-long time even after the variation of the exhaust gas flow rate disappears and thus has a great influence on the PM detection accuracy of the PM sensor. When the detection accuracy of the PM sensor degrades, it is difficult to determine whether the filter is abnormal with high accuracy and it is thus difficult to promote a user to repair the filter or the like.

The invention provides a filter abnormality determination system that can determine whether a filter is abnormal using a PM sensor with high accuracy.

In the invention, the applicant adjusts the time for performing filter abnormality determination based on the output of a PM sensor depending on a variation of an exhaust gas flow rate for a short time, that is, a variation of the exhaust gas flow rate per unit time, in an exhaust gas passage in which the PM sensor is disposed. According to this configuration, it is possible to suppress degradation in accuracy of filter abnormality determination by a decrease in detection accuracy of the PM sensor due to introduction failure of exhaust gas into the PM sensor.

According to an aspect of the invention, there is provided a filter abnormality determination system including: a filter disposed in an exhaust gas passage of an internal combustion engine so as to capture particulate matter in exhaust gas; a PM sensor configured to introduce a part of exhaust gas flowing in the exhaust gas passage downstream of the filter into a sensor body and to correlate a sensor output with an amount of particulate matter accumulated on a sensor element in the sensor body; an abnormality determining unit configured to perform filter abnormality determination based on the output of the PM sensor; a determination timing determining unit configured to determine a timing at which the abnormality determining unit performs the abnormality determination based on an estimated amount of particulate matter accumulated on the sensor element; and a determination performing adjusting unit configured to adjust the performing timing determined by the determination timing determining unit depending on a variation of an exhaust gas flow rate per unit time in the exhaust gas passage in which the PM sensor is disposed.

According to another aspect of the invention, there is provided a filter abnormality determination system including: a filter disposed in an exhaust gas passage of an internal combustion engine, the filter being configured to capture particulate matter in exhaust gas; a sensor including a sensor element in a body of the sensor, the sensor being configured to introduce a part of exhaust gas flowing in the exhaust gas passage downstream of the filter into the body, the sensor element being configured to output a value relevant to an accumulated amount of particulate matter on the sensor element; and an electronic control unit configured to a) perform filter abnormality determination based on the output of the sensor, b) estimate the accumulated amount of particulate matter on the sensor element, c) determine a performing timing of the abnormality determination based on the amount of particulate matter, and d) adjust the performing timing depending on a variation of an exhaust gas flow rate per unit time in the exhaust gas passage in which the sensor is disposed.

The filter abnormality determination system according to the aspect of the invention determines whether the filter disposed in the exhaust gas passage is abnormal. Here, the filter has a function of capturing particulate matter (PM) in exhaust gas. When an abnormal state such as cracks or erosion due to an excessive rise in temperature occurs in the filter, exhaust gas of which the PM is not satisfactorily captured flows out to the downstream side of the filter and thus the PM sensor is disposed on the downstream side of the filter so as to detect the exhaust gas. Here, the PM sensor is configured to introduce a part of exhaust gas flowing in the exhaust gas passage into the sensor body and to correlate the output of the PM sensor with the amount of PM accumulated by accumulating the PM included in the introduced exhaust gas on the sensor element disposed therein.

In the PM sensor having the above-mentioned configuration, since the PM in the exhaust gas is gradually introduced into the sensor body, the output of the PM sensor reflects the cumulative amount of PM introduced into the sensor body. Accordingly, in order for the abnormality determining unit to effectively determine the abnormal state of the filter on the basis of the output of the PM sensor, that is, to significantly reflect the abnormal state of the filter in the output of the PM sensor, the PM sensor introduces the PM in a predetermined period and uses the amount of PM accumulated on the sensor element in the period. Therefore, in order to enable the effective filter abnormality determination, the timing of performing the abnormality determination is determined by the determination timing determining unit on the basis of the estimated amount of PM accumulated on the sensor element.

However, as described above, when the variation of the exhaust gas flow rate per unit time (hereinafter, simply referred to as "variation of the exhaust gas flow rate" or "variation") in the exhaust gas passage in which the PM sensor is disposed increases, the exhaust gas is not properly introduced into the body of the PM sensor and thus the PM is not properly accumulated on the sensor element. Accordingly, there is a possibility that a deviation will occur between the abnormality determination performing timing determined by the determination timing determining unit and the timing suitable for the filter abnormality determination. In some cases, depending on the performing timing determined by the determination timing determining unit, there is a possibility that the filter abnormality determination will be performed in a situation in which the PM is not actually satisfactorily accumulated on the sensor element, that is, in a situation in which the amount of PM in the exhaust gas is not satisfactorily reflected and an excessively small amount of PM is accumulated, and the abnormality determining unit will erroneously determine that the filter is normal (erroneous normality determination).

Therefore, in the filter abnormality determination system according to the invention, the determination performing adjusting unit adjusts the performing timing determined by the determination timing determining unit depending on the variation of the exhaust gas flow rate. That is, the performing timing adjusted by the determination timing determining unit is adjusted by considering that it becomes more difficult to appropriately introduce the exhaust gas into the body of the PM sensor as the variation of the exhaust gas flow rate becomes larger. For example, in that it is thought that the amount of PM accumulated on the sensor element decreases as the variation of the exhaust gas flow rate becomes larger and the amount of exhaust gas introduced becomes smaller, the adjustment by the determination performing adjusting unit is performed so as to avoid a decrease in filter abnormality determination accuracy due to the decrease in the amount of PM accumulated. According to this configuration, the filter abnormality determination based on the output of the PM sensor is performed at an appropriate timing and it is thus possible to improve the abnormality determination accuracy in the abnormality determining unit.

In the filter abnormality determination system, the PM sensor may include an introduction portion configured to introduce the exhaust gas into the body of the sensor, and the PM sensor may be attached to the exhaust gas passage such that an introduction direction of exhaust gas by the introduction portion forms a predetermined angle about a flow direction of the exhaust gas in the exhaust gas passage. Here, the introduction direction is a direction in which the exhaust gas flows from the introduction portion into the sensor body. The predetermined angle defined by the introduction direction and the flow direction of the exhaust gas in the exhaust gas passage is an attachment angle of the PM sensor causing a situation in which the introduction of the exhaust gas through the introduction portion is hindered by a disturbance of an exhaust gas flow occurring when the variation of the exhaust gas flow rate in the exhaust gas passage increases. The PM sensor attached to the exhaust gas passage with the predetermined angle is easily affected by the variation of the exhaust gas flow rate in the exhaust gas passage at the time of detecting the PM and thus the invention can be suitably applied thereto.

In the filter abnormality determination system, the determination performing adjusting unit may be configured to avoid the performing of the abnormality determination by the determination timing determining unit when the variation of the exhaust gas flow rate per unit time is equal to or greater than a predetermined reference variation. The determination performing adjusting unit may be configured to perform the abnormality determination by the abnormality determining unit depending on the determination of the determination timing determining unit when the variation of the exhaust gas flow rate per unit time is less than the predetermined reference variation. Here, the predetermined reference variation is a threshold value for determining that the influence of the defective PM accumulation on the sensor element due to the introduction failure of the exhaust gas into the sensor body becomes relatively larger as the variation of the exhaust gas flow rate in the exhaust gas passage becomes larger.

Accordingly, when the variation of the exhaust gas flow rate is equal to or greater than the predetermined reference variation, it can be considered that a deviation occurs between the actual amount of PM in the exhaust gas and the amount of PM based on the output of the sensor and affects the abnormality determination accuracy of the abnormality determining unit with an undersirable influence. Therefore, in this case, the abnormality determination by the abnormality determining unit is avoided without depending on the abnormality determination performing timing determined by the determination timing determining unit. On the other hand, when the variation of the exhaust gas flow rate is less than the predetermined reference variation, the influence of the variation is considered to be ignored and the abnormality determination by the abnormality determining unit is performed at the timing determined by the determination timing determining unit.

Instead of the aspect in which the performing timing is adjusted by the determination performing adjusting unit, the following aspect in which the performing timing is adjusted may be employed. That is, in the filter abnormality determination system, the determination timing determining unit may be configured to estimate the amount of particulate matter accumulated on the sensor element and to determine that the timing of performing the abnormality determination by the abnormality determining unit comes in when the estimated amount of particulate matter accumulated reaches a predetermined determination-performing accumulated amount. In this case, the determination performing adjusting unit may be configured to adjust the performing timing by the determination timing determining unit depending on the non-detection time (time in which the variation of the exhaust gas flow rate per unit time is equal to or greater than a predetermined variation) of the PM sensor that is determined on the basis of the variation of the exhaust gas flow rate per unit time.

The aspect in which the determination timing determining unit estimates the amount of particulate matter accumulated on the sensor element and determines the abnormality determination performing timing by the abnormality determining unit on the basis of the estimated amount of particulate matter accumulated is significant in performing the abnormality determination at the timing at which a difference between a normal state and an abnormal state of the filter in the PM sensor is significant. In the aspect in which the abnormality determination performing timing is determined on the basis of the estimation result of the amount of PM accumulated on the sensor element, when the variation of the exhaust gas flow rate in the exhaust gas passage increases, the influence of the defective PM accumulation on the sensor element due to the introduction failure of the exhaust gas into the sensor body becomes relatively large and a deviation occurs between the estimated amount of PM accumulated on the sensor element and the actual amount of PM accumulated.

Therefore, in this case, a focus is put on the non-detection time of the PM sensor caused by the variation of the exhaust gas flow rate. As described above, when the variation of the exhaust gas flow rate increases, the exhaust gas is not introduced into the sensor body well due to the disturbance of the exhaust gas flow. As a result, the PM sensor cannot detect the PM in the exhaust gas flowing in the exhaust gas passage and thus the time in which the PM is not detected is referred to as "non-detection time of the PM sensor" in the invention. It is thought that the deviation between the estimated amount of PM accumulated on the sensor element and the actual amount of PM accumulated attributes to the non-detection time of the PM sensor. Accordingly, by adjusting the performing timing determined by the determination timing determining unit depending on the non-detection time of the PM sensor associated with the variation of the exhaust gas flow rate, it is possible to allow the abnormality determining unit to perform the abnormality determination at an appropriate timing.

In an aspect in which the abnormality determination performing timing is adjusted by the determination performing adjusting unit depending on the non-detection time of the PM sensor, for example, the determination performing adjusting unit may be configured to stop the estimating of the amount of particulate matter accumulated by the determination timing determining unit until the non-detection time of the PM sensor passes after the exhaust gas flow rate in the exhaust gas passage starts a variation. In this way, by temporarily stopping the estimating of the amount of PM accumulated on the sensor element of the PM sensor until the non-detection time passes, it is possible to prevent the estimated amount of PM accumulated from increasing and thus to avoid separation from the actual amount of PM accumulated on the sensor element. As a result, the performing timing determined by the determination timing determining unit is a timing at which the abnormality determination can be suitably performed by the abnormality determining unit.

In another aspect in which the abnormality determination performing timing is adjusted by the determination performing adjusting unit depending on the non-detection time of the PM sensor, for example, when the determination timing determining unit continues to estimate the amount of particulate matter accumulated regardless of the elapse of the non-detection time of the PM sensor after the exhaust gas flow rate in the exhaust gas passage starts a variation, the determination performing adjusting unit may be configured to correct the predetermined determination-performing accumulated amount or the estimated amount of particulate matter accumulated by the determination timing determining unit on the basis of the amount of particulate matter accumulated on the sensor element in a period until the non-detection time comes in after the exhaust gas flow rate in the exhaust gas passage starts the variation. In this aspect, the amount of PM accumulated on the sensor element is continuously estimated in comparison with the above-mentioned aspect. Accordingly, by correcting the predetermined determination-performing accumulated amount or the estimated amount of particulate matter by the determination timing determining unit on the basis of the deviation between the estimated amount of PM accumulated and the actual amount of PM accumulated which may occur until the non-detection time passes after the exhaust gas flow rate starts a variation, the influence of the deviation on the abnormality determination accuracy is removed. As a result, the performing timing determined by the determination timing determining unit is a timing at which the abnormality determination can be suitably performed by the abnormality determining unit.

In the filter abnormality determination system, the non-detection time may be set to be longer as the variation of the exhaust gas flow rate per unit time becomes larger. Through the study of the applicant of the invention, new knowledge has been obtained in which there is a tendency that the larger the variation of the exhaust gas flow rate becomes, the larger the degree of introduction failure of the PM into the sensor body of the PM sensor becomes. When the degree of introduction failure increases, the non-detection time of the PM sensor becomes longer. Accordingly, by setting the correlation between the variation of the exhaust gas flow rate and the non-detection time as described above, it is possible to implement the appropriate adjustment by the determination performing adjusting unit depending on the non-detection time of the PM sensor.

In the filter abnormality determination system, for example, the sensor element may include an insulating layer on which the particulate matter in the exhaust gas is accumulated and a pair of electrodes disposed adjacent to the insulating layer, the sensor element may be configured to electrically capture the particulate matter in the exhaust gas on the insulating layer by supplying an electric current to the pair of electrodes, and the PM sensor may be a sensor configured to detect the amount of particulate matter in the exhaust gas on the basis of electric resistance between the pair of electrodes which is determined depending on the particulate matter accumulated on the insulating layer.

The filter abnormality determination system may further include an indicator unit configured to indicate the abnormality determination result by the abnormality determining unit to a user. Accordingly, since the determination result can be surely indicated to the user, it is possible to promote the user to interchange, repair, or the like the filter.

According to the invention, it is possible to provide a filter abnormality determination system that can determine whether a filter is abnormal using a PM sensor with high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a specific embodiment of the invention will be described with reference to the accompanying drawings. The sizes, materials, shapes, relative arrangements, and the like of the constituent components described in this embodiment is not intended for limiting the technical scope of the invention thereto, as long as not particularly mentioned.

Figure 1:
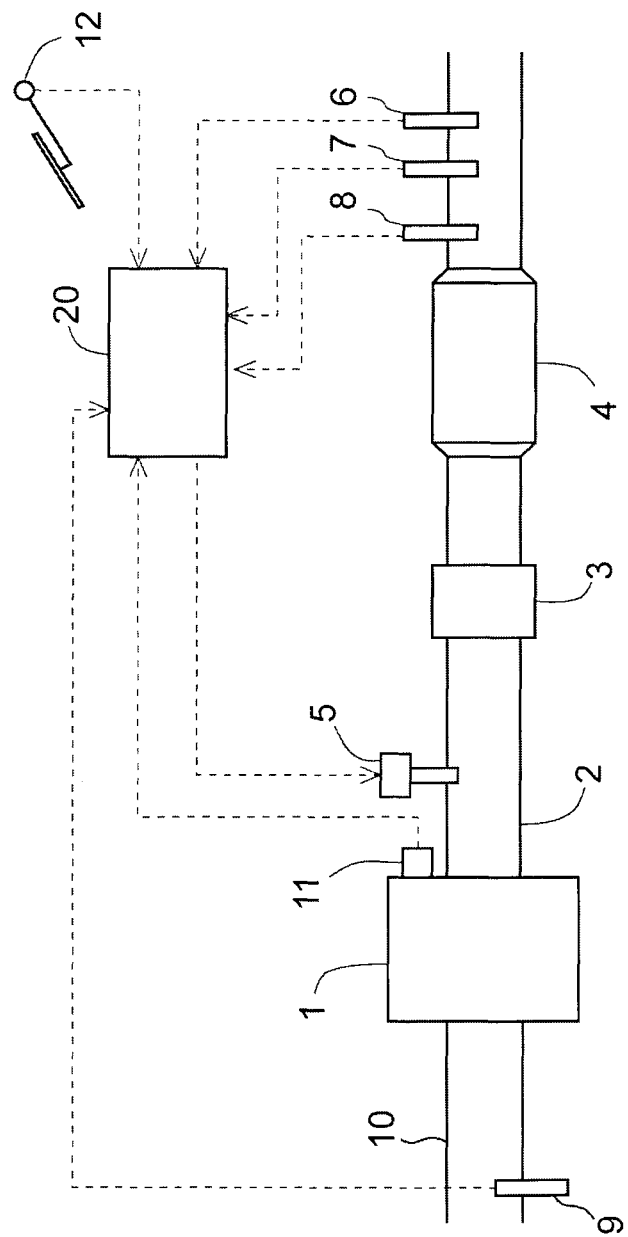
FIG. 1 is a diagram schematically illustrating a configuration of an internal combustion engine on which a filter abnormality determination system according to the invention is mounted.

FIG. 1 is a diagram schematically illustrating a configuration of an internal combustion engine 1 on which a filter abnormality determination system according to the invention is mounted. The internal combustion engine 1 is a diesel engine for driving a vehicle. The internal combustion engine 1 is connected to an intake air passage 10 and an exhaust gas passage 2. The intake air passage 10 is provided with an air flow meter 9 for detecting an amount of intake air of the internal combustion engine 1. The internal combustion engine 1 is connected to the exhaust gas passage 2 provided with a particulate filter 4 (hereinafter, simply referred to as "filter") capturing particulate matter (PM) in exhaust gas. An oxidation catalyst 3 is disposed on the upstream side of the filter 4 in the exhaust gas passage 2. The oxidation catalyst 3 has a function of oxidizing unburned fuel components, NO, and the like in exhaust gas.

A fuel supply valve 5 supplying fuel (unburned fuel) to exhaust gas flowing into the oxidation catalyst 3 is disposed on the upstream side of the oxidation catalyst 3. Instead of the supply from the fuel supply valve 5, unburned fuel may be supplied to the oxidation catalyst 3 by increasing the amount of unburned fuel included in the exhaust gas by combustion control in the internal combustion engine 1. For example, by post injection that is performed after main injection in the vicinity of a top dead center of a compression stroke, unburned fuel may be supplied to the oxidation catalyst 3. A PM sensor 8 detecting an amount of PM included in exhaust gas flowing in the exhaust gas passage 2 on the downstream side of the filter 4, a temperature sensor 7 detecting the temperature of the exhaust gas, and a pressure sensor 6 detecting the exhaust gas pressure on the downstream side of the filter 4 are disposed in the vicinity of the filter 4. Details of the PM sensor 8 will be described later.

The internal combustion engine 1 is provided with an electronic control unit (ECU) 20. The ECU 20 is a unit controlling the operating state or the like of the internal combustion engine 1. The ECU 20 is electrically connected to an air flow meter 9, a crank position sensor 11, an accelerator opening sensor 12, and the like in addition to the fuel supply valve 5, the pressure sensor 6, the temperature sensor 7, and the PM sensor 8. Accordingly, the fuel supply valve 5 supplies fuel to the exhaust gas in response to an instruction from the ECU 20. The crank position sensor 11 detects a crank angle of the internal combustion engine 1 and outputs the detected crank angle to the ECU 20. The accelerator opening sensor 12 detects an accelerator opening of the vehicle in which the internal combustion engine 1 is mounted and outputs the detected accelerator opening to the ECU 20. As a result, the ECU 20 calculates an engine rotation speed of the internal combustion engine 1 on the basis of the output of the crank position sensor 11 and calculates an engine load of the internal combustion engine 1 on the basis of the output of the accelerator opening sensor 12. The ECU 20 may calculate an exhaust gas flow volume in the exhaust gas passage 2 on the basis of the output of the air flow meter 9. This is because a constant correlation is present between the intake air flow rate and the exhaust gas flow volume in the internal combustion engine 1.

In an exhaust system of the internal combustion engine 1 having the above-mentioned configuration, in brief, particulate matter (PM) included in exhaust gas is captured by the filter 4 and thus discharge of the PM to the outside is suppressed. In addition, an NOx selective-reduction catalyst for purifying NOx, a reductant supply unit for purifying NOx, and the like may be provided. The PM capturing function of the filter 4 may degrade and thus the filter may enter an abnormal state in which the PM cannot be satisfactorily captured. An example thereof is a destroyed state in which crack occurs in a base material of the filter 4 and the PM cannot be satisfactorily captured due to the cracking positions. Another example thereof is an eroded state in which when the PM captured by the filter 4 is removed by oxidation by an increase in exhaust gas temperature with a supply of fuel from the fuel supply valve 5, the filter 4 is in an excessive high-temperature state by the oxidation heat thereof, the base material is eroded, and the PM cannot be satisfactorily captured due to the eroded positions. The abnormal state of the filter 4 can also include a state in which the filter 4 is detached from the exhaust gas control system of the internal combustion engine 1, that is, a case in which the filter 4 is not disposed, in that the PM cannot be substantially captured by the filter 4.

Figure 2:
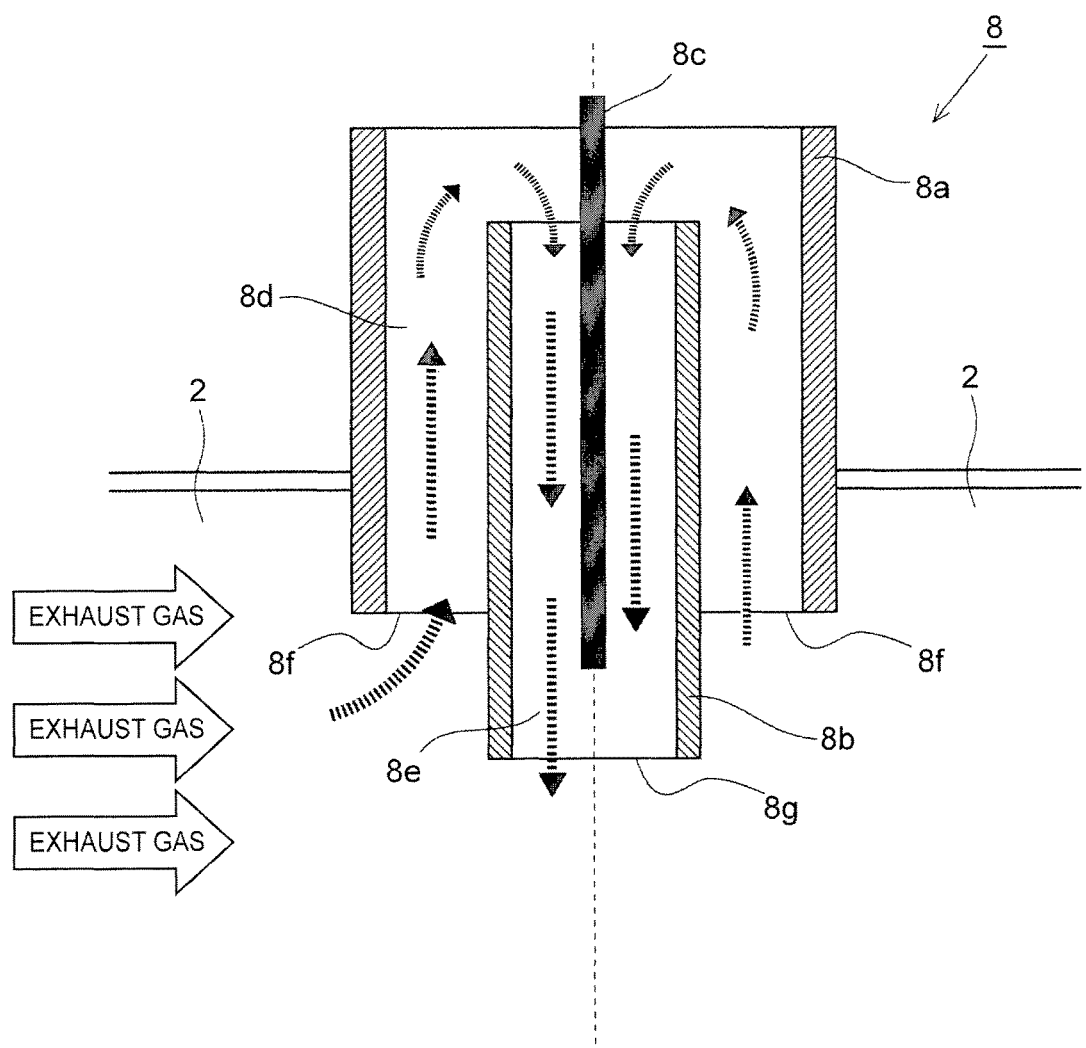
FIG. 2 is a diagram schematically illustrating a configuration of a PM sensor disposed in an exhaust gas passage of the internal combustion engine illustrated in FIG. 1.

In the abnormal states of the filter 4, the ECU 20 uses the output of the PM sensor 8 disposed on the downstream side of the filter 4 to suitably determine the abnormal states. Accordingly, in causing the ECU 20 to determine whether the filter 4 is abnormal, the structure of the PM sensor 8 will be first described below. FIG. 2 illustrates a schematic configuration of the PM sensor 8 and an installation state of the PM sensor 8 in the exhaust gas passage 2. The PM sensor 8 includes a sensor element 8c in which the PM in the exhaust gas is attached to and accumulated, an inner cover 8b covering the sensor element 8c and an outer cover 8a covering the inner cover 8b. An exhaust gas channel 8d in which exhaust gas flows in the length direction (the length direction of the sensor element 8c) of both covers is formed between the inner cover 8b and the outer cover 8a. One end 8f of the exhaust gas channel 8d is opened to the exhaust gas passage 2 side and the other end is connected to an exhaust gas channel 8e formed in the inner cover 8b. Accordingly, in the PM sensor 8, exhaust gas is introduced into the exhaust gas channel 8d from an end 8f which is an opening of the exhaust gas channel 8d, flows into the exhaust gas channel 8e, and is returned to the exhaust gas passage 2 from an end 8g of the exhaust gas channel 8e opened to the exhaust gas passage 2 side. In this way, when exhaust gas introduced into the PM sensor 8 flows in the exhaust gas channel 8e, the exhaust gas comes in contact with the sensor element 8c disposed therein and thus the PM in the exhaust gas is attached to and accumulated on the sensor element 8e.

Figure 3:
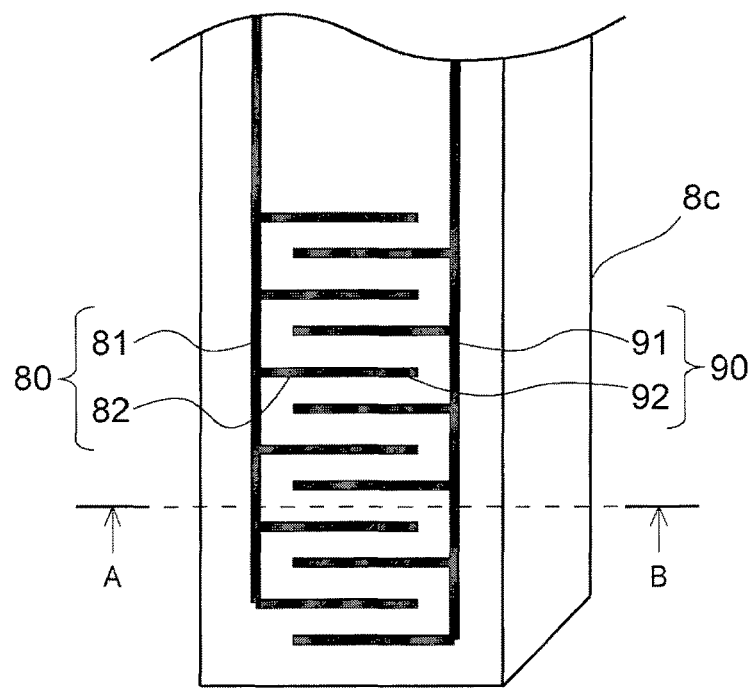
FIG. 3 is a diagram schematically illustrating a configuration of a sensor element of the PM sensor illustrated in FIG. 2.

The detailed structure of the sensor element 8c will be described below with reference to FIGS. 3, 4. FIG. 3 is a partially-enlarged view of the sensor element 8c of the PM sensor 8. As illustrated in FIG. 3, the sensor element 8c includes a pair of electrodes 80, 90 on the surface thereof. The electrodes 80, 90 are arranged with a constant gap therebetween in a state where both do not come in contact with each other. More specifically, the electrodes 80, 90 include conductive portions 81, 91 extending in the length direction of the sensor element 8c, and plural conductive portions 82, 92 extending in the direction perpendicular to the conductive portions 81, 91 are formed in the vicinity of the tip of the sensor element 8c. That is, the electrodes 80, 90 include conductive portions 82, 92 arranged in a comb teeth shape in the vicinity of the tip of the sensor element 8c, and the portions in a comb teeth shape are arranged to engage with each other.

Figure 4:
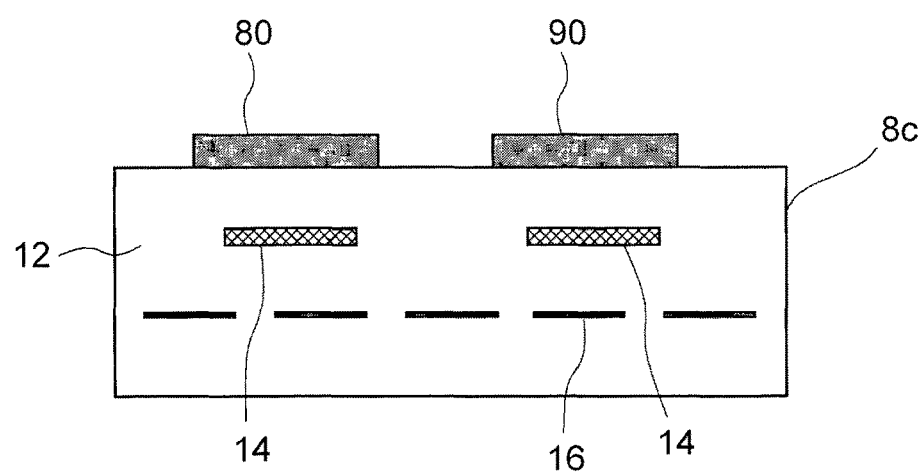
FIG. 4 is a cross-sectional view of the sensor element of the PM sensor illustrated in FIG. 3.

FIG. 4 is a schematic cross-sectional view taken along line A-B of FIG. 3. The upper side of FIG. 4 corresponds to the surface side of the sensor element 8c of FIG. 3. As illustrated in FIG. 4, the electrodes 80, 90 are arranged on the insulating layer 12. The insulating layer 12 has a function of capturing the PM. When a voltage is applied across the electrodes 80, 90 from a power source via a power supply circuit or the like, an electric field is generated between the electrodes 80, 90, charged PM in the exhaust gas is attracted by the electric field, and the PM is accumulated between the electrodes 80, 90.

Temperature sensors 14 such as thermocouples corresponding to the electrodes 80, 90 are buried in the insulating layer 12 in the vicinity of the electrodes 80, 90. A detector (not illustrated) detecting an electromotive force generated in the corresponding temperature sensor 14 is connected to each temperature sensor 14 via a predetermined circuit, and the ECU 20 can detect the temperatures in the vicinity of the electrodes 80, 90 by detecting the electromotive forces. A heater 16 is buried under the temperature sensors 14. The heater 16 is formed such that the heating center is located just under the electrodes 80, 90. The heater 16 can be supplied with power via a power supply circuit or the like. When the heater 16 is supplied with power, the sensor element 8c is heated and thus the PM accumulated between the electrodes 80, 90 can be removed by combustion. In this way, the process of removing the PM accumulated between the electrodes 80, 90 by supply power to the heater 16 is referred to as a "sensor recycling process". The sensor recycling process is a process of adjusting the voltage application such that the detected temperature of the temperature sensor 14 becomes a temperature suitable for removing the PM by combustion, and is performed to remove the accumulated PM when the amount of PM accumulated between the electrodes 80, 90 is greater than a predetermined threshold.

The PM sensor 8 having this configuration is electrically connected to the ECU 20. The PM sensor 8 outputs a sensor output corresponding to the electric resistance between the electrodes 80, 90 to the ECU 20. The ECU 20 can detect an amount of PM in exhaust gas on the basis of the sensor output of the PM sensor 8. Specifically, the detection of the PM by the PM sensor 8 is started just after the sensor recycling process is performed on the PM sensor 8. Just after the sensor recycling process, the PM is not accumulated between the electrodes 80, 90. Accordingly, both electrodes are electrically insulated from each other and the sensor output at that time is zero.

With the introduction of exhaust gas into the PM sensor 8, the PM is slowly accumulated between the electrodes 80, 90. However, since the amount of PM accumulated is small at the initial time, a conduction path based on the PM accumulated between the electrodes 80, 90 is not formed yet therebetween. Accordingly, in this state, the electrodes 80, 90 are insulated from each other and the sensor output is maintained at zero. Thereafter, when PM is accumulated between the electrodes 80, 90 and reaches a predetermined amount of PM accumulated, a conduction path is formed between the electrodes 80, 90 due to the accumulated PM. When the conduction path is formed, the electric resistance between the electrodes 80, 90 decreases and the sensor output of the PM sensor 8 is output. The more the amount of PM accumulated becomes, the broader the conduction path becomes and the smaller the electric resistance between the electrodes 80, 90 becomes. In this way, the PM sensor 8 uses the decrease in electric resistance between the electrodes 80, 90 associated with the amount of PM accumulated as the sensor output.

Figure 5:
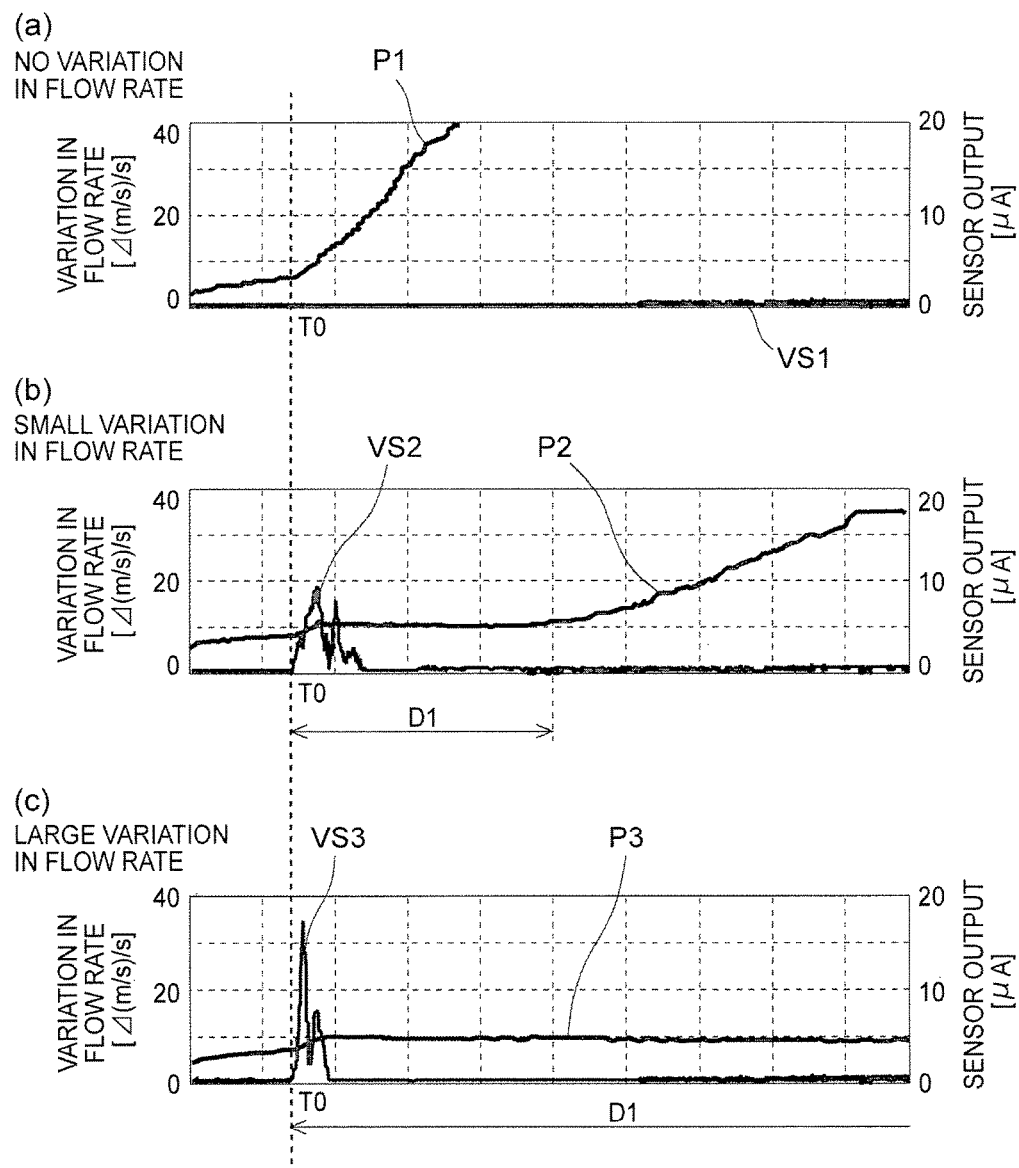
FIG. 5 is a diagram illustrating a variation of an exhaust gas flow rate in the exhaust gas passage of the internal combustion engine on which the filter abnormality determination system according to the invention is mounted and a transition of the output of the PM sensor for each representative flow rate variation.

When the abnormality of the filter 4 is determined using the PM sensor 8 having these output characteristics, a characteristic of the PM sensor 8 having an influence on the abnormality determination accuracy and a phenomenon obtained as the new knowledge by the applicant of the invention will be described below with reference to FIGS. 5, 6. FIG. 5 illustrates the variation of an exhaust gas flow rate (variation of the exhaust gas flow rate per unit time) in the exhaust gas passage 2 and a transition of the sensor output of the PM sensor 8 for each representative magnitude of the flow rate variation. Specifically, the upper part (a) illustrates a transition when there is no flow rate variation (the flow rate variation is very small to such an extent to be considered as zero), the middle part (b) illustrates a transition when the flow rate variation is small (of which the peak value is 20 m/s/s), and the lower part (c) illustrates a transition when the flow rate variation is large (of which the peak value is 35 m/s/s). In (a), (b), and (c) of FIG. 5, the transition of the variation of the exhaust gas flow rate are indicated by VS1, VS2, and VS3, and the transition of the sensor output is indicated by P1, P2, and P3. The vertical axes in (a), (b), and (c) of FIG. 5 represent the time and the scales are the same.

Here, (a), (b), and (c) of FIG. 5, illustrate a situation in which exhaust gas including a predetermined amount of PM reaches the PM sensor 8, and (b) and (c) of FIG. 5 illustrate a situation in which the variation of the exhaust gas flow rate is started at the time T0. In this situation, when there is no variation of the exhaust gas flow rate ((a) of FIG. 5), the PM sensor 8 starts outputting the sensor output at the time point of time T0 and the sensor output slowly increases. At this time, when there is no variation of the exhaust gas flow rate, it can be understood that the exhaust gas is introduced into the PM sensor 8 well and the amount of PM accumulated on the sensor element 8c increases.

On the other hand, when the variation of the exhaust gas flow rate is relatively small ((b) FIG. 5), the PM sensor 8 starts outputting the sensor output at a time point at which a time D1 passes after time T0 and the sensor output slowly increases. That is, in the period in which the time D1 passes after the exhaust gas flow rate starts the variation indicated by VS2, the PM detection by the PM sensor 8 is not almost performed. This is because a disturbance occurs in the exhaust gas flow in the vicinity of the PM sensor 8 due to the variation of the exhaust gas flow rate and the introduction of exhaust gas from the end 8f of the PM sensor 8 illustrated in FIG. 2 is hindered. In this embodiment, the time D1 is referred to as a "non-detection time" of the PM sensor 8. The disturbance of the exhaust gas flow occurring due to the variation of the exhaust gas flow rate substantially converges with the lapse of the time D1, the exhaust gas is thus introduced into the PM sensor 8, and the sensor output increases. When the variation of the exhaust gas flow rate is large ((c) of FIG. 5), the degree of disturbance of the exhaust gas flow in the vicinity of the PM sensor 8 becomes greater and thus the non-detection time D1 of the PM sensor 8 becomes longer than that in (b) of FIG. 5.

In this way, in the PM sensor 8, when the variation of the exhaust gas flow rate occurs, characteristics that the introduction of exhaust gas into the inside thereof is hindered and the non-detection time becomes longer as the variation becomes greater can be found. In the non-detection time, the PM is not actually accumulated on the sensor element 8c of the PM sensor 8 and thus there is a possibility that erroneous determination will be made in the abnormality determination control of the filter 4 in the related art on the assumption that the PM is accumulated. The abnormality determination control of the filter 4 according to the related art will be described below with reference to FIG. 6. In (a) of FIG. 6, a transition of the vehicle speed of the vehicle on which the internal combustion engine 1 is mounted is indicated by a line L1. In (b) of FIG. 6, a transition of the amount of PM in exhaust gas flowing in the exhaust gas passage 2 in which the PM sensor 8 is disposed is indicated by a line L2 and a transition of the estimated amount of PM accumulated on the sensor element 8c of the PM sensor 8 (hereinafter, "estimated amount of PM accumulated" is indicated by a line L3. In (c) of FIG. 6, a transition of the sensor output of the PM sensor 8 is indicated by a line L4.

Figure 6:
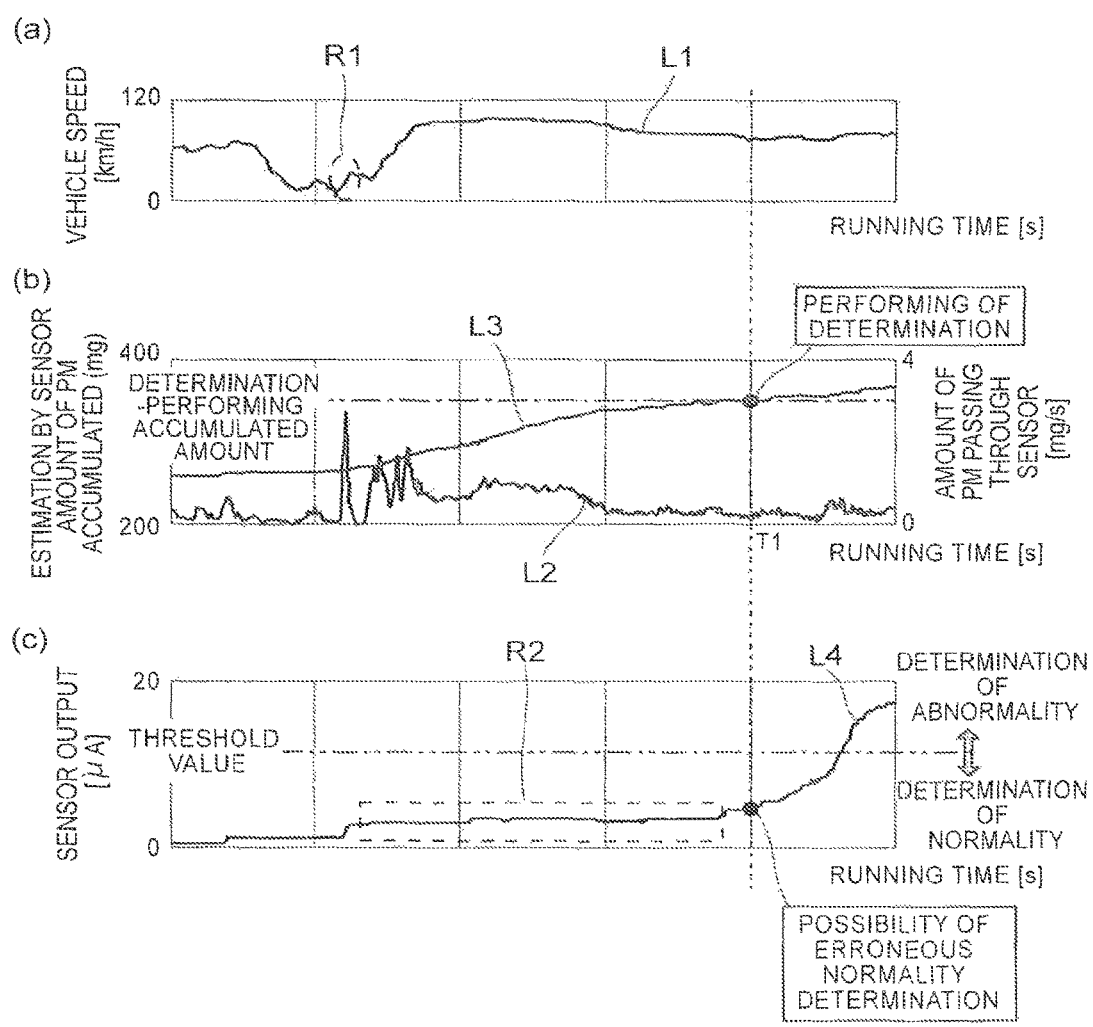
FIG. 6 is a diagram illustrating transitions of a vehicle speed of a vehicle in which the internal combustion engine is mounted, an amount of PM passing through the PM sensor, an amount of PM accumulated in the PM sensor, and the output of the PM sensor when the filter abnormality determination is performed on the basis of the output of the PM sensor disposed in the exhaust gas passage according to the related art.

In the abnormality determination control according to the related art, when the sensor output of the PM sensor 8 is greater than a threshold value, it is determined that the filter 4 is in an abnormal state (see (c) of FIG. 6). In the PM sensor 8, the PM in exhaust gas is accumulated on the sensor element 8c and the amount of PM accumulated has a relevance to the sensor output. In order to effectively determine the abnormal state of the filter 4, it is necessary to introduce the PM into the PM sensor 8 in a certain period and to strongly reflect the abnormal state of the filter 4 in the amount of PM accumulated. Accordingly, on the assumption that a part of exhaust gas discharged from the internal combustion engine 1 and passing through the filter 4 is introduced into the PM sensor 8 and the PM included in the introduced exhaust gas is accumulated on the sensor element 8c, the amount of PM accumulated on the sensor element 8c is estimated. When the estimated amount of PM accumulated reaches a determination-performing accumulated amount set as an amount of PM accumulated with which the effective abnormal determination is possible (time T1 illustrated in (b) of FIG. 6), the abnormal determination based on the sensor output of the PM sensor 8 is performed.

In the period indicated by R1 in (a) of FIG. 6, the vehicle on which the internal combustion engine 1 is mounted is rapidly accelerated and then the acceleration is continued. As a result, after the period R1, the state in which the actual amount of PM in the exhaust gas increases is maintained as indicated by the line L2. Here, the estimated amount of PM accumulated is estimated such that the amount of PM accumulated on the sensor element 8c increases with the lapse of time by reflecting the amount of PM included in the exhaust gas in consideration of the accelerated state in the internal combustion engine 1. However, since the exhaust gas flow rate in the exhaust gas passage 2 greatly increases with the rapid acceleration of the vehicle, the non-detection time occurs in which the accumulation of the PM on the sensor element 8c is not performed well and the sensor output does not vary as indicated by a period R2 in (c) of FIG. 6 due to a phenomenon in which the introduction of exhaust gas into the PM sensor 8 is hindered due to the variation of the exhaust gas flow rate. As a result, at the time point at which the estimated amount of PM accumulated reaches the determination-performing accumulated amount, the PM is not actually accumulated on the sensor element 8c to the amount reflecting the amount of PM in exhaust gas to such an extent to enable the effective abnormality determination. In some cases, when the abnormality determination is performed at that time point, there is a possibility that it will be erroneously determined that the filter 4 is normal for the reason why the sensor output is lower than a threshold value.

Figure 7:
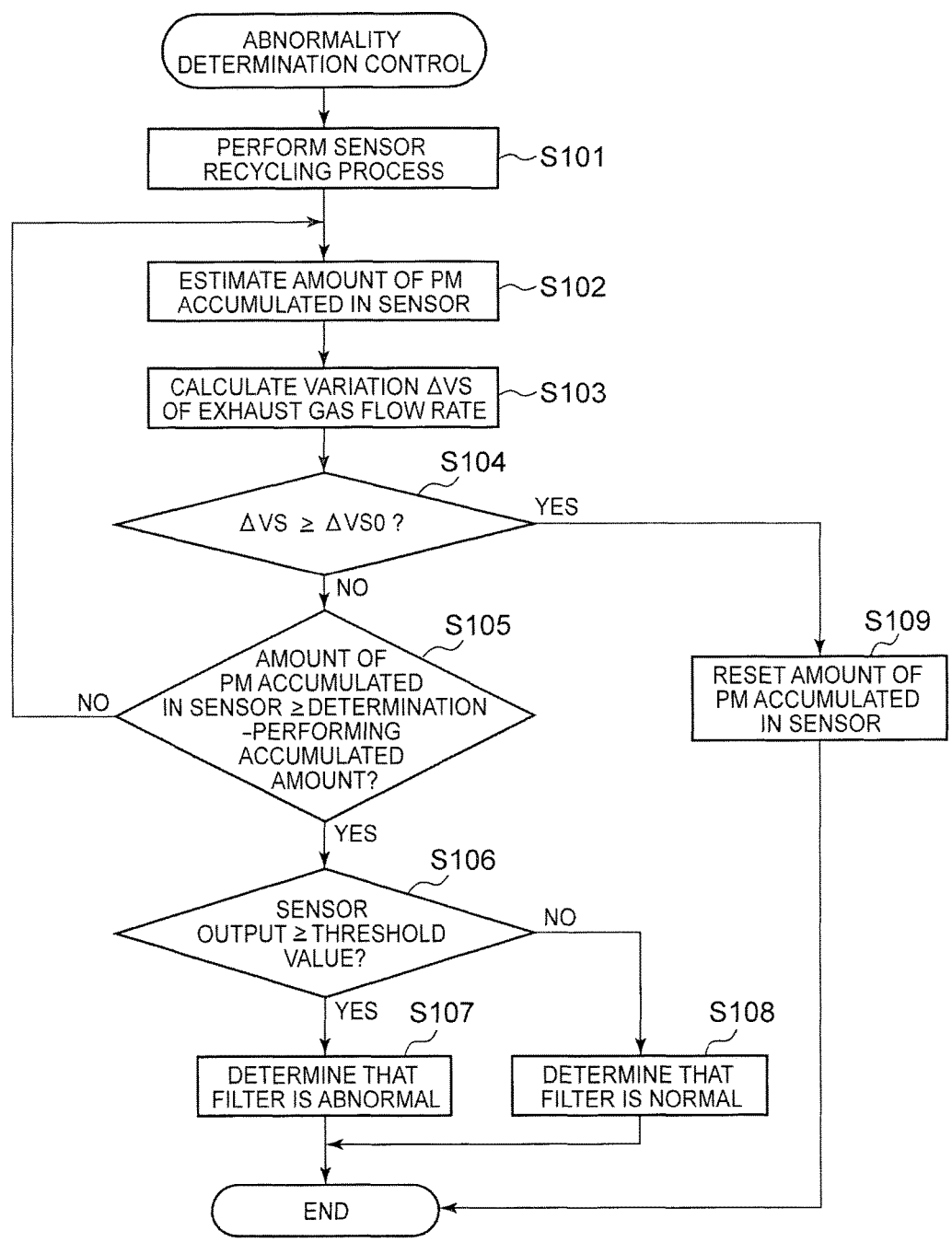
FIG. 7 is a first flowchart illustrating filter abnormality determination control which is performed in the filter abnormality determination system according to the invention.

Accordingly, in the abnormality determination system of the filter 4 according to this embodiment, the abnormality determination control illustrated in FIG. 7 is performed in consideration of the phenomenon in which the introduction of exhaust gas into the PM sensor 8 is hindered due to the variation of the exhaust gas flow rate and the improvement in the abnormality determination accuracy of the filter 4 is achieved. The abnormality determination control is performed by a control program stored in the ECU 20. The abnormality determination control according to this embodiment will be described below with reference to FIG. 7.

First, in S101, the sensor recycling process is performed to remove PM accumulated on the sensor element 8c of the PM sensor 8 by combustion. Specifically, the temperature of the sensor element 8c is raised by supplying power to the heater 16. When the process of S101 is finished, the control flow goes to S102.

In S102, the amount of PM accumulated on the sensor element 8c is estimated. The estimation process is also performed in the related art as described above, but is described again as the estimation of the amount of PM accumulated in the invention. Specifically, at the time point at which the process of S102 is performed, the amount of PM included in exhaust gas is estimated on the basis of the operating state (for example, an engine load or an engine rotation speed) of the internal combustion engine 1, and the amount of PM newly accumulated on the sensor element 8c at the processing time point is estimated on the basis of the amount of PM in the exhaust gas and the exhaust gas flow volume on the assumption that the PM is accumulated on the sensor element 8c by exposing the PM sensor 8 to the exhaust gas including the PM. By adding the amount of PM newly accumulated to the estimated amount of PM accumulated on the sensor element 8c estimated in the previous process of estimating the amount of PM accumulated, the estimated amount of PM accumulated on the sensor element 8c at the time point at which the process of S102 is performed is calculated. When the process of S102 is finished, the control flow goes to S103.

In S103, the variation of the exhaust gas flow rate ΔVS in the exhaust gas passage 2 in which the PM sensor 8 is disposed is calculated. Specifically, the exhaust gas flow volume V is calculated using the state equation expressed by Expression (1).

$$V = n \cdot R \cdot T / P \quad (1)$$

Here, n represents an amount of exhaust gas material, R represents a gas constant, T represents an exhaust gas temperature, and P represents an exhaust gas pressure. The output of the temperature sensor 7 is used as the exhaust gas temperature T. The output of the pressure sensor 6 is used as the exhaust gas pressure P. When the pressure sensor 6 is not installed, a pressure obtained by adding the relative pressure value in the exhaust gas passage 2 calculated in consideration of the exhaust gas flow volume to the output of an atmospheric pressure sensor not illustrated may be employed as the exhaust gas pressure P. Here, n is calculated using Expression (2).

$$n = (\text{exhaust gas flow rate})/(\text{molecular weight of exhaust gas}) \quad (2)$$

Then, by dividing the exhaust gas flow volume V calculated by Expression (1) by the transverse cross-sectional area S (the cross-sectional area in the direction perpendicular to the exhaust gas flow) of the exhaust gas pipe forming the exhaust gas passage 2, an exhaust gas flow rate U is calculated. By calculating the difference between the exhaust gas flow rate U calculated in the previous calculation process and the new exhaust gas flow rate U calculated in the current calculation process, that is, by differentiating the calculated exhaust gas flow rate U with respect to the time, the variation of the exhaust gas flow rate ΔVS at the time point at which the process of S103 is performed is calculated. When the process of S103 is finished, the control flow goes to S104.

In S104, it is determined whether the variation of the exhaust gas flow rate ΔVS calculated in S103 is equal to or greater than a predetermined reference variation ΔVS0. The predetermined reference variation ΔVS0 is a variation threshold value for determining that introduction failure of exhaust gas into the PM sensor 8 occurs as the variation of the exhaust gas flow rate ΔVS in the exhaust gas passage 2 increases. Accordingly, when the determination result of S104 is negative, it means that the introduction of exhaust gas into the PM sensor 8 is performed well and then the determination process of S105 is performed. In S105, it is determined whether the estimated amount of PM accumulated on the sensor element 8c is equal to or greater than the determination-performing accumulated amount. The determination-performing accumulated amount is a threshold value of the amount of PM accumulated for determining the timing of performing the abnormality determination of the filter 4 based on the output of the PM sensor 8 as illustrated in (b) of FIG. 6. That is, the determination process of S105 corresponds to the process by the determination timing determining unit according to the invention. The control flow goes to S106 when the determination result of S105 is positive, and the processes of S102 and the steps subsequent thereto are repeatedly performed when the determination result of S105 is negative.

In S106, it is determined whether the output of the PM sensor is equal to or greater than a threshold value as illustrated in (c) of FIG. 6 so as to perform the abnormality determination of the filter 4. The threshold value is a threshold value for determining whether exhaust gas of which the PM is not satisfactorily captured flows to the downstream side thereof because the abnormal state of the filter 4 is exhibited. When the determination result of S106 is positive, the control flow goes to step S107 and it is determined that the filter 4 is in an abnormal state. On the other hand, when the determination result of S106 is negative, the control process goes to S108 and it is determined that the filter 4 is in a normal state. The processes of S106 to S108 correspond to the processes by the abnormal determining unit according to the invention.

When the determination result of S104 is positive, it means that a state in which the estimated amount of PM accumulated on the sensor element 8c is separated from the actual amount of PM accumulated used to determine the output of the PM sensor 8 due to the introduction failure of exhaust gas into the PM sensor 8 and the output of the PM sensor 8 does not increase in spite of exposure of the PM sensor 8 to the exhaust gas including the PM is formed (the output state of the PM sensor 8 indicated by the period R2 in (c) of FIG. 6). Accordingly, when the abnormality determination of the filter 4 illustrated in S106 is performed in this case, the possibility of erroneous determination increases. Therefore, when the determination result of S104 is positive, the control flow goes to S109 and the amount of PM accumulated on the sensor element 8c which has been estimated hitherto is reset in S109 so as to avoid the performing of the abnormality determination of the filter 4 (that is, the processes of S106 to S108) through the determination process of S105. The abnormality determination control is restarted from S101 by this reset.

In the abnormality determination control illustrated in FIG. 7, on the assumption that the performing of the abnormality determination of the filter 4 is determined on the basis of the estimated amount of PM accumulated on the sensor element 8c, when the variation of the exhaust gas flow rate is equal to or greater than the predetermined reference variation in the period from the sensor recycling process to the performing of the abnormality determination, the introduction failure of exhaust gas into the PM sensor 8 occurs and thus the performing of the abnormality determination is avoided. As a result, it is possible to avoid the erroneous determination relevant to the abnormality determination of the filter 4 described with reference to FIG. 6 and to suitably maintain the determination accuracy. In this embodiment, when it is determined that the filter 4 is in an abnormality state, an indicator or the like may be turned on and off to indicate the user of the internal combustion engine 1 that the abnormal state is exhibited.

Modification Example

Figure 8:
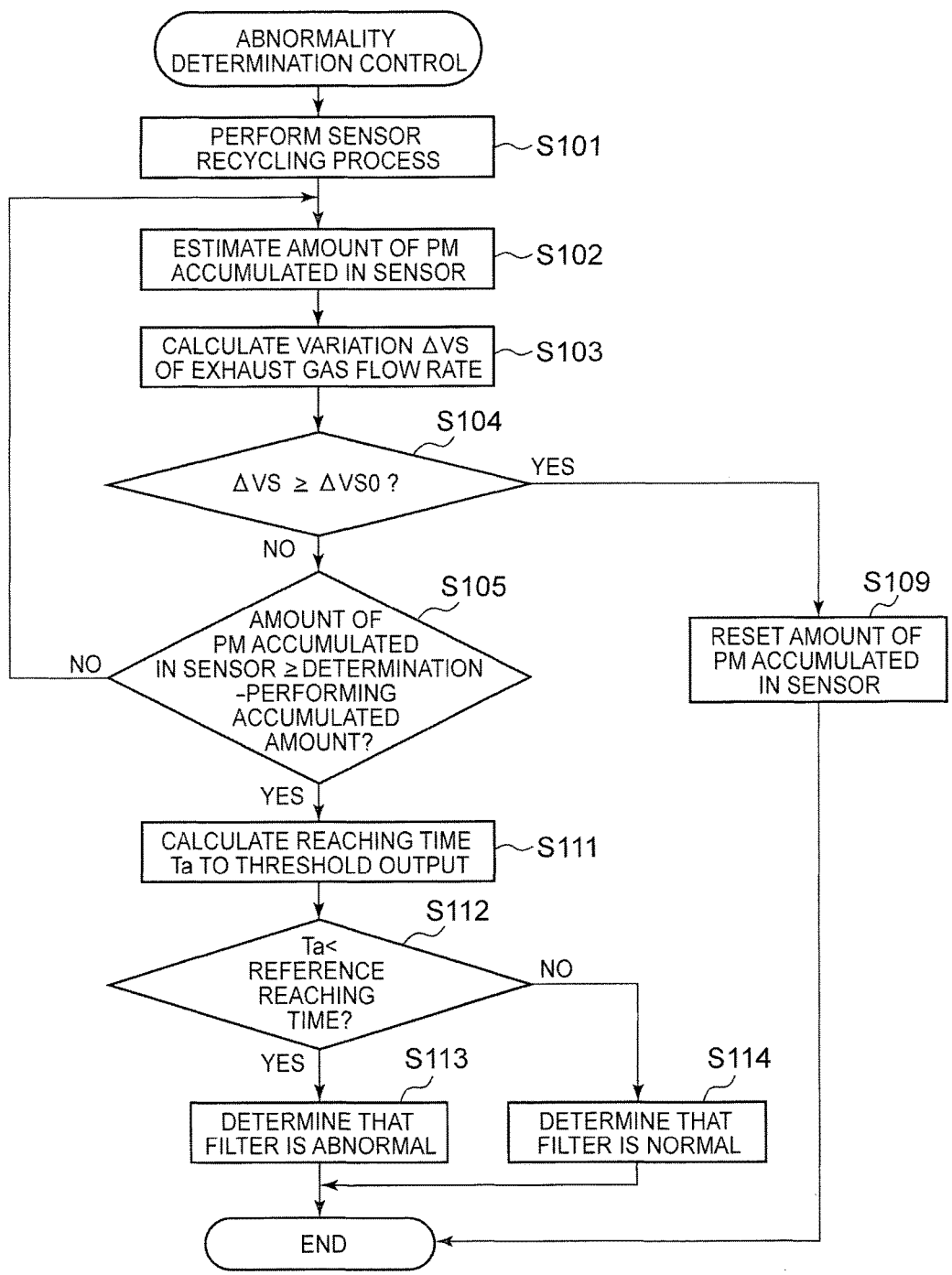
FIG. 8 is a second flowchart illustrating the filter abnormality determination control which is performed in the filter abnormality determination system according to the invention.

In the above-mentioned embodiment, the output of the PM sensor 8 and the threshold value are compared as the abnormality determination of the filter 4, but for example, as illustrated in FIG. 8, the abnormality determination of the filter 4 may be performed on the basis of the reaching time until the output of the PM sensor 8 reaches a predetermined output value, instead of the above-mentioned aspect. Specifically, when the determination result of S105 is positive, the process of S111 is performed. In S111, the time Ta until the output of the PM sensor 8 reaches a threshold output value is calculated. The reaching time Ta is defined as a time until the output value reaches the threshold output value (for example, a sensor output which is equal to the threshold value in S106) after the sensor recycling process of S101 is finished.

Then, after the process of S111 is finished, it is determined in S112 whether the reaching time Ta is shorter than a reference reaching time. The reference reaching time is a time reflecting the abnormal state of the filter 4, and it can be thought that when the reaching time Ta is shorter than the reference reaching time, exhaust gas of which the PM is not satisfactorily captured flows to the downstream side of the filter 4. Accordingly, when the determination result of S112 is positive, the control flow goes to S113 and it is determined that the filter 4 is in an abnormal state. On the other hand, when the determination result of S112 is negative, the control flow goes to S114 and it is determined that the filter 4 is in a normal state. In this way, even when the abnormality determination of the filter 4 is performed on the basis of the reaching time Ta and the variation of the exhaust gas flow rate is equal to or greater than the predetermined reference variation by the abnormality determination control according to the invention, it is possible to avoid erroneous determination relevant to the abnormality determination of the filter 4 by avoiding the performing of the abnormality determination.

A second embodiment of the abnormality determination control that is performed in the internal combustion engine 1 will be described below with reference to FIG. 9. Here, the same processes as included in the abnormality determination control illustrated in FIG. 7 out of the processes included in the abnormality determination control illustrated in FIG. 9 will be referenced by the same reference signs and detailed description thereof will not be repeated. In this embodiment, the process of S102 is not performed after the process of S101, but the process of S103 is performed instead. When the process of S103 is finished, the process of S201 is performed. In S201, similarly to S104, it is determined whether the variation of the exhaust gas flow rate ΔVS is equal to or greater than the predetermined reference variation ΔVS0. The control flow goes to S202 when the determination result of S201 is positive, and the control flow goes to S204 to be described later when the determination result of S201 is negative.

Then, in S202, the non-detection time D1 of the PM sensor 8 is calculated on the basis of the variation of the exhaust gas flow rate ΔVS calculated in S103. The non-detection time D1 is the same as described above with reference to FIG. 5 and has a relevance to the variation of the exhaust gas flow rate ΔVS. Accordingly, the correlation between the variation of the exhaust gas flow rate ΔVS and the non-detection time D1 in the PM sensor 8 is measured in advance and a control map is formed in advance in the memory of the ECU 20. By accessing the control map at the time of performing the process of S202, the non-detection time D1 of the PM sensor 8 is calculated. When the process of S202 is finished, the control flow goes to S203.

In S203, it is determined whether the non-detection time D1 of the PM sensor 8 passes after the variation of the exhaust gas flow rate ΔVS is started (for example, time T0 in (b) and (c) of FIG. 5). The control flow goes to S204 when the determination result of S203 is positive, and the process of S203 is repeated when the determination result of S203 is negative. In S204, the amount of PM accumulated on the sensor element 8c is estimated similarly to S102. After S204, the abnormality determination of the filter 4 of S106 to S108 is performed via the determination process of S105.

Figure 9:
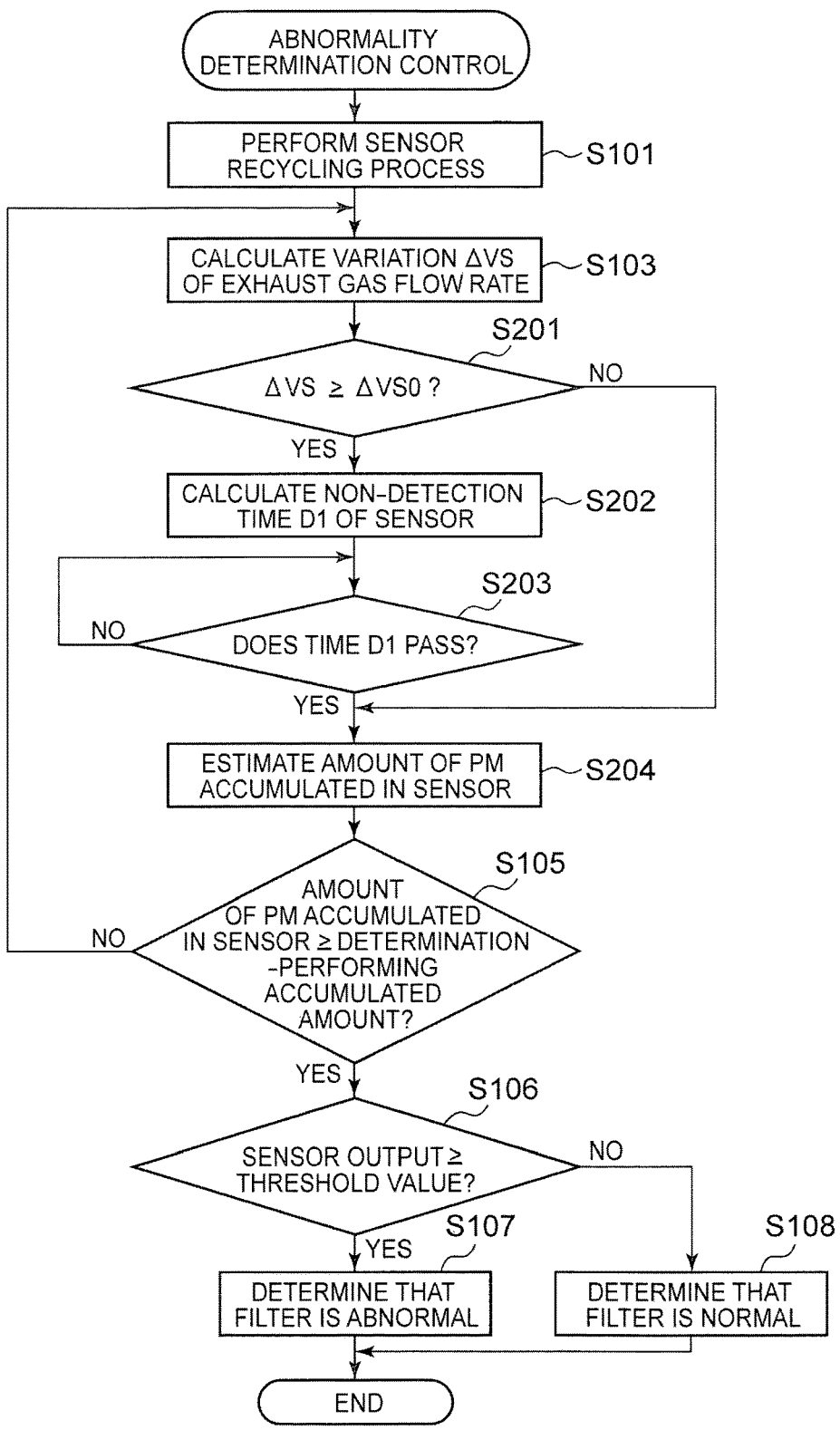
FIG. 9 is a third flowchart illustrating the filter abnormality determination control which is performed in the filter abnormality determination system according to the invention.

In the abnormality determination control illustrated in FIG. 9, on the assumption that the performing of the abnormality determination of the filter 4 is determined on the basis of the estimated amount of PM accumulated on the sensor element 8c, when the variation of the exhaust gas flow rate is equal to or greater than the predetermined reference variation in the period from the sensor recycling process to the performing of the abnormality determination, the amount of PM accumulated on the sensor element 8c is not estimated or the estimating of the amount of PM accumulated is on standby in the period until the non-detection time D1 of the PM sensor 8 passes after the variation of the exhaust gas flow rate is started. This considers that the variation of the exhaust gas flow rate becomes relatively larger, the introduction failure of exhaust gas into the PM sensor 8 occurs, and it is thus actually difficult to perform the accumulation of the PM on the sensor element 8c, as described above. By performing this process, the abnormality determination performing timing T1 illustrated in (b) of FIG. 6 is delayed by the non-detection time D1, and the abnormality determination performing timing of the filter 4 can be determined in a state in which the deviation between the actual amount of PM accumulated on the sensor element 8c and the estimated amount of PM accumulated is decreased as much as possible. Accordingly, it is possible to avoid the erroneous determination relevant to the abnormality determination of the filter 4 and to suitably maintain the determination accuracy.

A third embodiment of the abnormality determination control that is performed in the internal combustion engine 1 will be described below with reference to FIG. 10. Here, the same processes as included in the abnormality determination control illustrated in FIGS. 7 to 9 out of the processes included in the abnormality determination control illustrated in FIG. 10 will be referenced by the same reference signs and detailed description thereof will not be repeated. In this embodiment, the process of S102 is not performed after the process of S101, but the process of S103 is performed instead. When the process of S103 is finished, the processes of S301 to S309 are performed. First, in S301, similarly to S104, it is determined whether the variation of the exhaust gas flow rate ΔVS is equal to or greater than the predetermined reference variation ΔVS0. The control flow goes to S302 when the determination result of S301 is positive, and the control flow goes to S306 to be described later when the determination result of S301 is negative.

When the determination result of S301 is positive, the non-detection time D1 of the PM sensor 8 is calculated in S302 on the basis of the variation of the exhaust gas flow rate ΔVS calculated in S103, similarly to S202. Thereafter, in S303, similarly to S102, the amount of PM accumulated on the sensor element 8c is estimated. Thereafter, in S304, an estimated amount of PM accumulated PX added as the amount of PM accumulated on the sensor element 8c in the process of S303 is calculated in the non-detection time of the PM sensor 8 due to the variation of the exhaust gas flow rate, that is, in the period until the non-detection time D1 passes after the variation of the exhaust gas flow rate is started. In this embodiment, since the amount of PM accumulated is estimated in S306 to be described later, the process of S304 is a process of calculating the estimated amount of PM accumulated PX added in the estimation process of S303 out of the amount of PM accumulated estimated in the estimation processes of S303 and S306. When the process of S304 is finished, it is determined in S305 whether the non-detection time D1 of the PM sensor 8 passes after the variation of the exhaust gas flow rate ΔVS is started, similarly to S203. The control flow goes to S307 when the determination result of S305 is positive, and the processes of S303 and steps subsequent thereto are repeated when the determination result of S305 is negative.

Here, when the determination result of S301 is negative, the amount of PM accumulated on the sensor element 8c is estimated in S306, similarly to S303 and then the control flow goes to S307.

Then, in S307, the determination-performing accumulated amount which is the threshold value for determining the timing of performing the abnormality determination of the filter 4 is corrected on the basis of the amount of PM accumulated PX calculated in S304. Specifically, the amount of PM accumulated obtained by adding the amount of PM accumulated PX to the non-corrected determination-performing accumulated amount is set as the corrected determination-performing accumulated amount. In this control, when the determination result of S301 is not positive, that is, when the amount of PM accumulated PX is not calculated, the non-corrected determination-performing accumulated amount is set as the corrected determination-performing accumulated amount, for the purpose of convenience of control. When the process of S307 is finished, the control flow goes to S308.

In S308, it is determined whether the estimated amount of PM accumulated on the sensor element 8c is equal to or greater than the determination-performing accumulated amount corrected in S307. The determination process of S308 corresponds to the process of determining the timing of performing the abnormality determination of the filter 4, similarly to S105. The control flow goes to S309 when the determination result of S308 is positive, and the processes of S103 and steps subsequent thereto are repeated when the determination result of S308 is negative. The process of S309 corresponds to the above-mentioned abnormality determination of the filter 4 and collectively represents the processes of S106 to S108.

Figure 10:
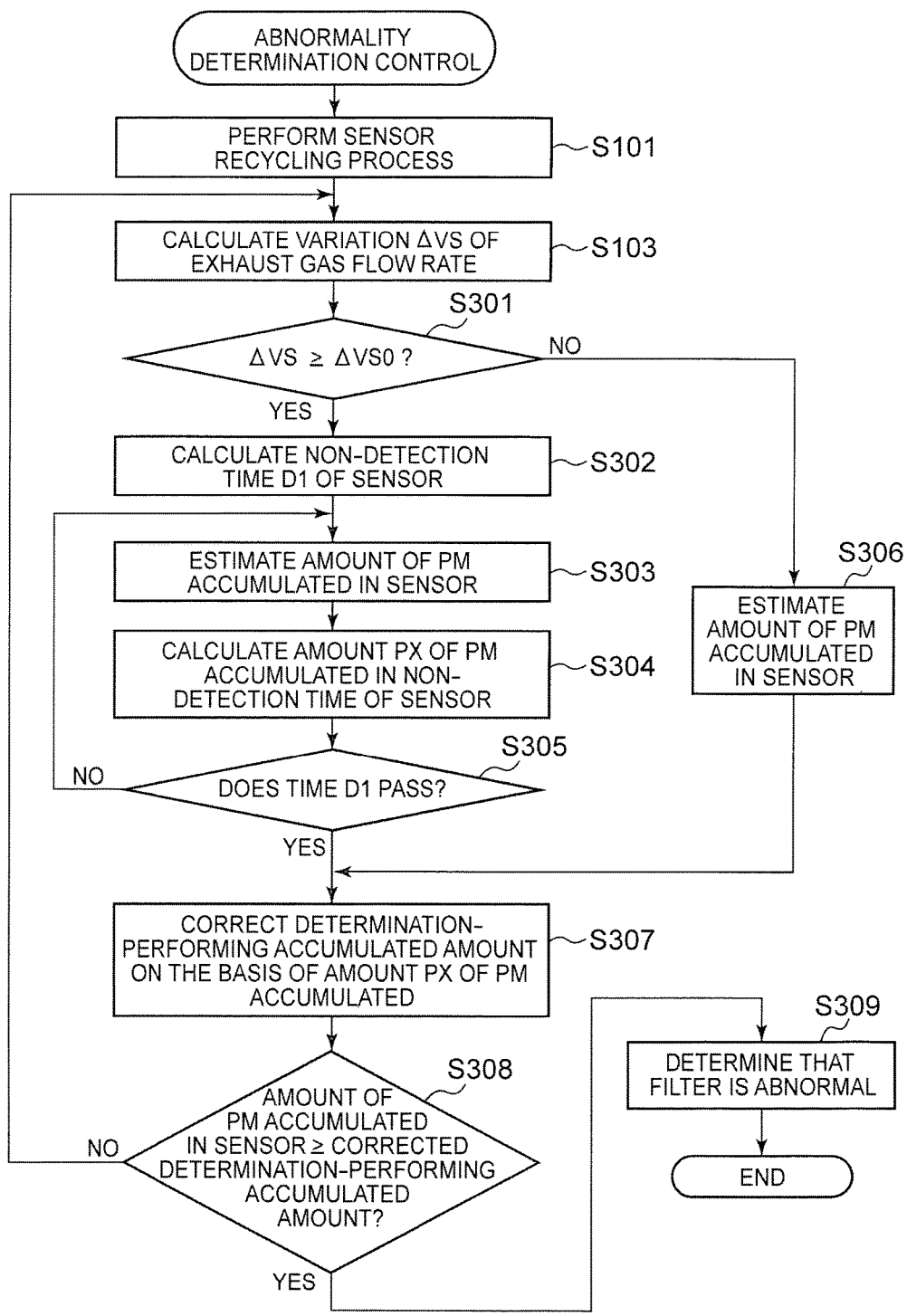
FIG. 10 is a fourth flowchart illustrating the filter abnormality determination control which is performed in the filter abnormality determination system according to the invention.

In the abnormality determination control illustrated in FIG. 10, on the assumption that the performing of the abnormality determination of the filter 4 is determined on the basis of the estimated amount of PM accumulated on the sensor element 8c, the process of estimating the amount of PM accumulated on the sensor element 8c is continuously performed regardless of whether the variation of the exhaust gas flow rate is equal to or greater than the predetermined reference variation. However, when the variation of the exhaust gas flow rate in the period from the sensor recycling process to the performing of the abnormality determination is equal to or greater than the predetermined reference variation, the determination-performing accumulated amount which is the threshold value for determining the abnormality determination performing timing is corrected to increase by the amount of PM accumulated PX on the basis of the amount of PM accumulated PX in the non-detection time. By performing this process, the abnormality determination performing timing T1 illustrated in (b) of FIG. 6 is delayed by the increase in the determination-performing accumulated amount, and the abnormality determination performing timing of the filter 4 can be determined in a state in which the deviation between the actual amount of PM accumulated on the sensor element 8c and the estimated amount of PM accumulated is decreased as much as possible. Accordingly, it is possible to avoid the erroneous determination relevant to the abnormality determination of the filter 4 and to suitably maintain the determination accuracy.

A fourth embodiment of the abnormality determination control that is performed in the internal combustion engine 1 will be described below with reference to FIG. 11. Here, the same processes as included in the abnormality determination control illustrated in FIG. 10 out of the processes included in the abnormality determination control illustrated in FIG. 11 will be referenced by the same reference signs and detailed description thereof will not be repeated. In this embodiment, the processes of S401 and S402 are performed instead of the processes of S307 and S308 illustrated in FIG. 10. Specifically, when the determination result of S305 is positive or when the process of S306 is finished, the process of S401 is performed. In S401, the amount of PM accumulated on the sensor element 8c, which has been estimated to the current time point, is corrected on the basis of the amount of PM accumulated PX calculated in S304. Specifically, the amount of PM accumulated obtained by subtracting the amount of PM accumulated PX from the non-corrected estimated amount of PM accumulated is set as the corrected determination-performing accumulated amount. In this control, when the determination result of S301 is not positive, that is, when the amount of PM accumulated PX is not calculated, the non-corrected estimated amount of PM accumulated is set as the corrected estimated amount of PM accumulated, for the purpose of convenience of control. When the process of S401 is finished, the control flow goes to S402.

Then, in S402, it is determined whether the estimated amount of PM accumulated corrected in S401 is equal to or greater than the determination-performing accumulated amount. The determination process of S401 corresponds to the process of determining the timing of performing the abnormality determination of the filter 4, similarly to S105. The control flow goes to S309 when the determination result of S402 is positive, and the processes of S103 and steps subsequent thereto are repeated when the determination result of S402 is negative.

Figure 11:
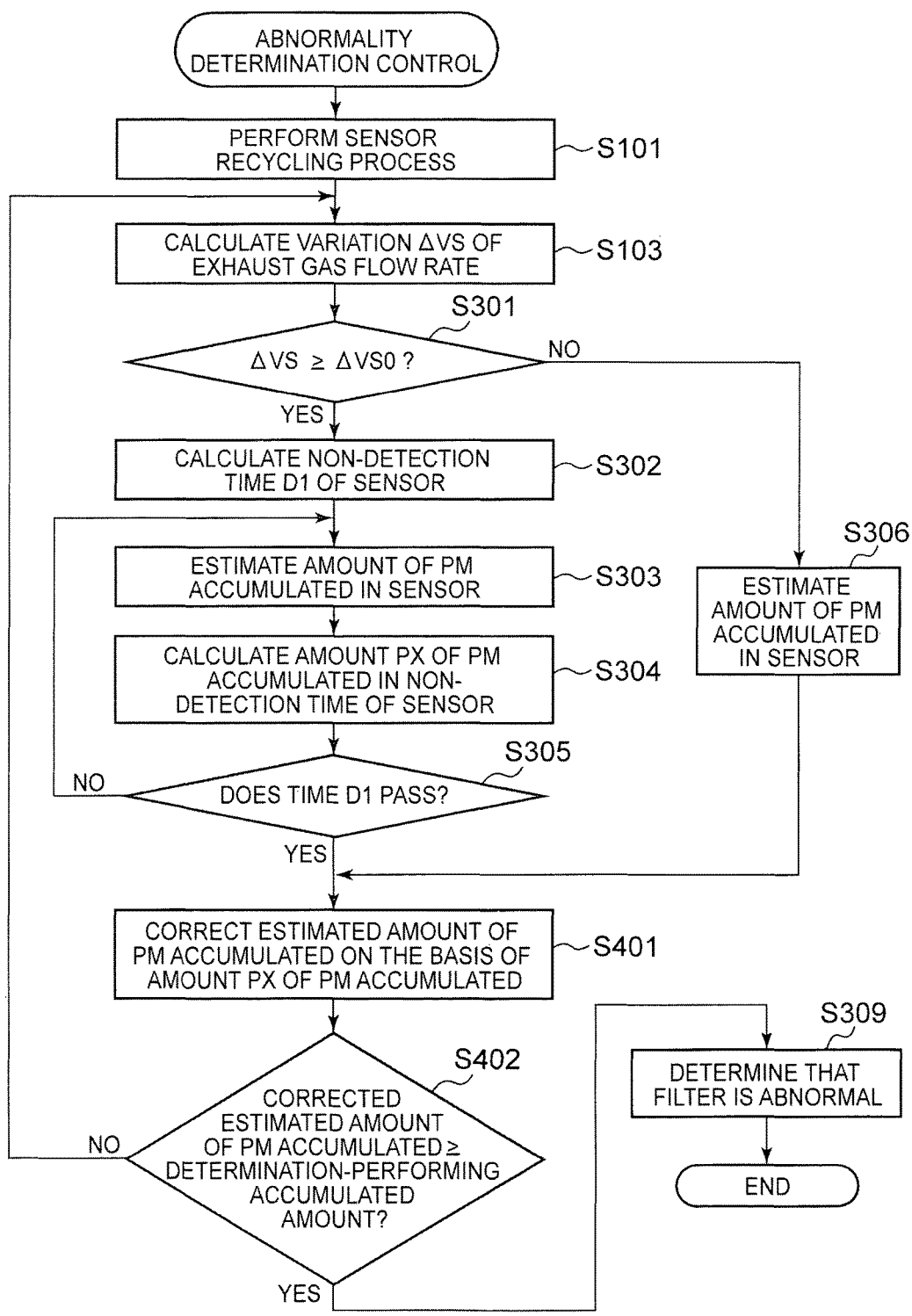
FIG. 11 is a fifth flowchart illustrating the filter abnormality determination control which is performed in the filter abnormality determination system according to the invention.

In the abnormality determination control illustrated in FIG. 11, on the assumption that the performing of the abnormality determination of the filter 4 is determined on the basis of the estimated amount of PM accumulated on the sensor element 8c, the process of estimating the amount of PM accumulated on the sensor element 8c is continuously performed regardless of whether the variation of the exhaust gas flow rate is equal to or greater than the predetermined reference variation. However, when the variation of the exhaust gas flow rate in the period from the sensor recycling process to the performing of the abnormality determination is equal to or greater than the predetermined reference variation, the amount of PM accumulated on the sensor element 8c, which has been estimated to that time point, is corrected to decrease by the amount of PM accumulated PX on the basis of the amount of PM accumulated PX in the non-detection time. By performing this process, the abnormality determination performing timing T1 illustrated in (b)

of FIG. 6 is delayed by the decrease in the estimated amount of PM accumulated, and the abnormality determination performing timing of the filter 4 can be determined in a state in which the deviation between the actual amount of PM accumulated on the sensor element 8c and the estimated amount of PM accumulated is decreased as much as possible. Accordingly, it is possible to avoid the erroneous determination relevant to the abnormality determination of the filter 4 and to suitably maintain the determination accuracy.

The invention claimed is:

1. A filter abnormality determination system comprising:
   a filter disposed in an exhaust gas passage of an internal combustion engine, the filter being configured to capture particulate matter in exhaust gas;
   a sensor including a sensor element in a body of the sensor, the sensor being configured to introduce a part of exhaust gas flowing in the exhaust gas passage downstream of the filter into the body, the sensor element being configured to output a value relevant to an accumulated amount of particulate matter on the sensor element; and
   an electronic control unit configured to
   a) perform filter abnormality determination based on the output of the sensor,
   b) estimate the accumulated amount of particulate matter on the sensor element,
   c) determine a timing at which the abnormality determination is performed based on the output of the sensor, and
   d) adjust the timing at which the abnormality determination is performed depending on a variation of an exhaust gas flow rate per unit time in the exhaust gas passage in which the sensor is disposed,
   wherein the electronic control unit is configured to determine that the timing at which the abnormality determination is performed is when the accumulated amount of particulate matter reaches a predetermined amount,
   wherein the electronic control unit is configured to calculate a first time in which the variation of the exhaust gas flow rate per unit time is equal to or greater than a predetermined variation, and
   wherein the electronic control unit is configured to adjust the timing at which the abnormality determination is performed depending on the first time.

2. The filter abnormality determination system according to claim 1, wherein the sensor includes an introduction portion configured to introduce the exhaust gas into the body of the sensor, and
   wherein the sensor is attached to the exhaust gas passage such that an angle of an introduction direction of exhaust gas introduced by the introduction portion is a predetermined angle about a flow direction of the exhaust gas in the exhaust gas passage.

3. The filter abnormality determination system according to claim 1, wherein the electronic control unit is configured to avoid performing of the abnormality determination when the variation of the exhaust gas flow rate per unit time is equal to or greater than a predetermined reference variation, and
   wherein the electronic control unit is configured to perform the abnormality determination when the variation of the exhaust gas flow rate per unit time is less than the predetermined reference variation.

4. The filter abnormality determination system according to claim 1, wherein the electronic control unit is configured to stop estimating the accumulated amount of particulate matter until the first time passes after a variation of the exhaust gas flow rate in the exhaust gas passage starts.

5. The filter abnormality determination system according to claim 1, wherein the electronic control unit is configured to correct the predetermined amount or an estimated amount of the accumulated particulate matter based on the accumulated amount of particulate matter in a period until the first time passes after the variation of the exhaust gas flow rate in the exhaust gas passage starts.

6. The filter abnormality determination system according to claim 1, wherein the electronic control unit is configured to set the first time to be longer as the variation of the exhaust gas flow rate per unit time becomes larger.

7. The filter abnormality determination system according to claim 1, wherein the sensor element includes an insulating layer on which the particulate matter in the exhaust gas is accumulated and a pair of electrodes disposed adjacent to the insulating layer,
   wherein the sensor element is configured to electrically capture the particulate matter in the exhaust gas on the insulating layer by supplying an electric current to the pair of electrodes, and
   wherein the sensor is configured to detect the accumulated amount of particulate matter in the exhaust gas based on electric resistance between the pair of electrodes which is determined depending on the particulate matter accumulated on the insulating layer.

8. The filter abnormality determination system according to claim 1, further comprising an indicator configured to indicate an abnormality determination result to a user.

* * * * *